United States Patent [19]
Kelly et al.

[11] 4,067,049
[45] Jan. 3, 1978

[54] SOUND EDITING SYSTEM

[75] Inventors: Joseph D. Kelly, Glendale; Emory M. Cohen, Santa Monica; Barry K. Henley, Canoga Park; Hammond H. Holt, Sherman Oaks; John Agalsoff, Downey, all of Calif.

[73] Assignee: Glen Glenn Sound, Hollywood, Calif.

[21] Appl. No.: 619,030

[22] Filed: Oct. 2, 1975

[51] Int. Cl.² .............................................. G11B 15/18
[52] U.S. Cl. ........................................ 360/14; 360/13
[58] Field of Search .......................... 360/13, 14, 72; 340/259, 260, 324 R, 378, 379, 325, 221; 179/100.3 P

[56] References Cited
U.S. PATENT DOCUMENTS

| | | | |
|---|---|---|---|
| 3,230,307 | 1/1966 | Boonsall | 360/14 |
| 3,238,293 | 3/1966 | Hartman | 360/14 |
| 3,575,552 | 4/1971 | Grant et al. | 360/13 |
| 3,721,757 | 3/1973 | Ettlinger | 360/14 |
| 3,887,941 | 6/1975 | Dann et al. | 360/14 |

Primary Examiner—Marshall M. Curtis
Attorney, Agent, or Firm—Gardner and Anten

[57] ABSTRACT

A sound editing system having a "library" of prerecorded sound effects stored on magnetic recording tape for insertion at selected locations and with a selected quality for forming a final sound track for use in association with a visual display such as a television program is disclosed.

6 Claims, 14 Drawing Figures

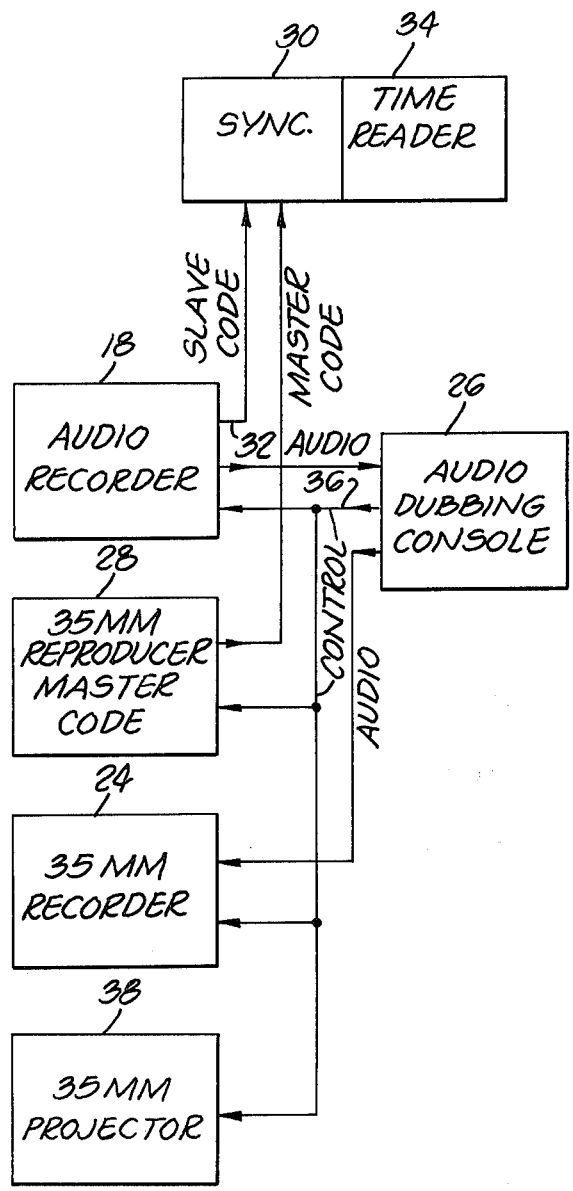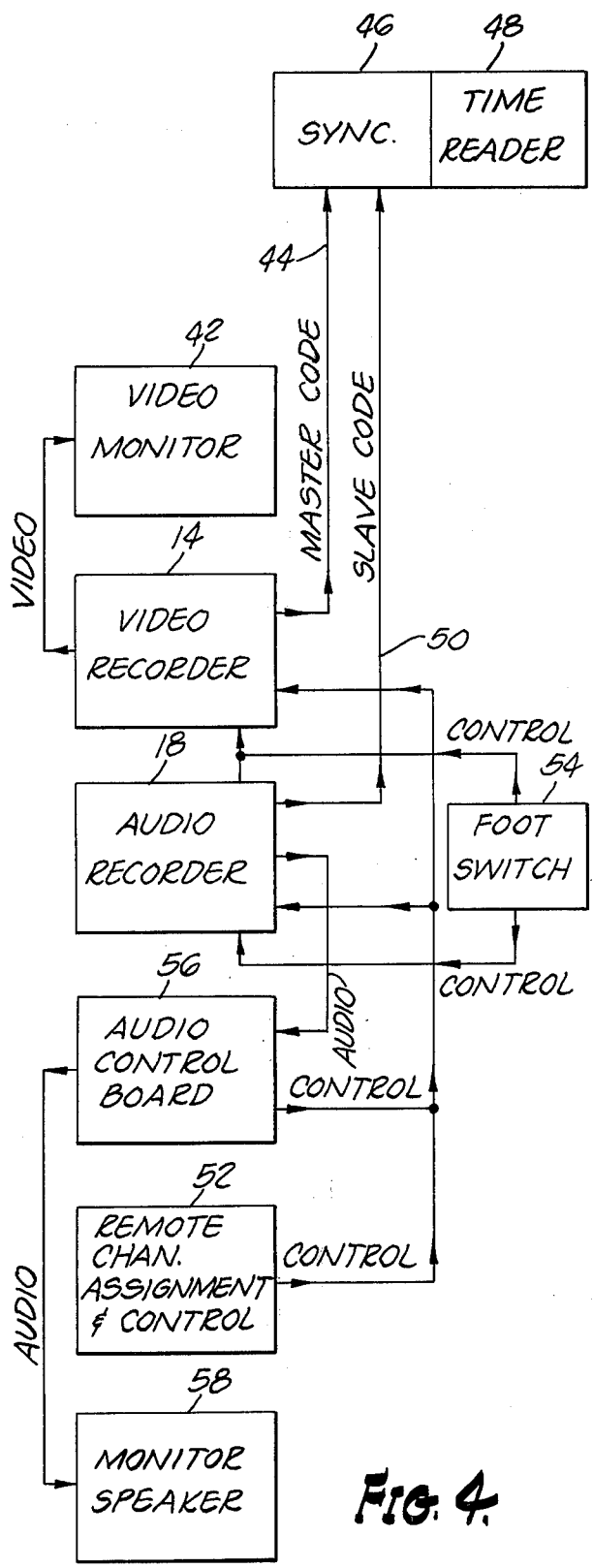
Fig. 3.
Fig. 4.

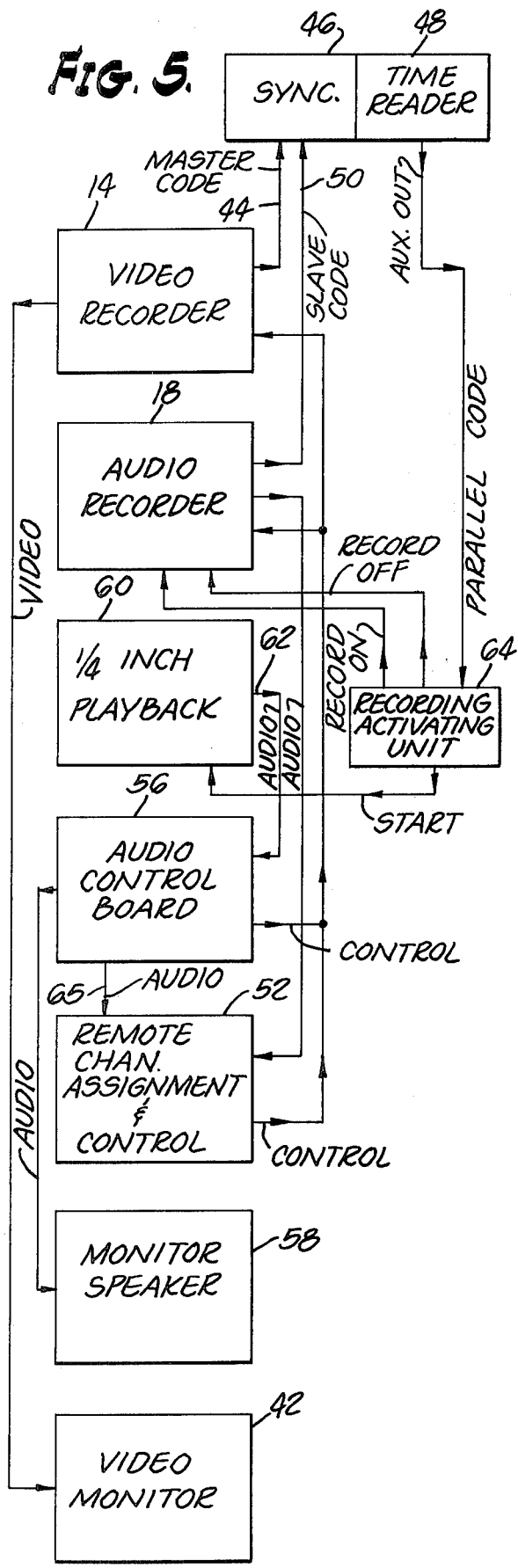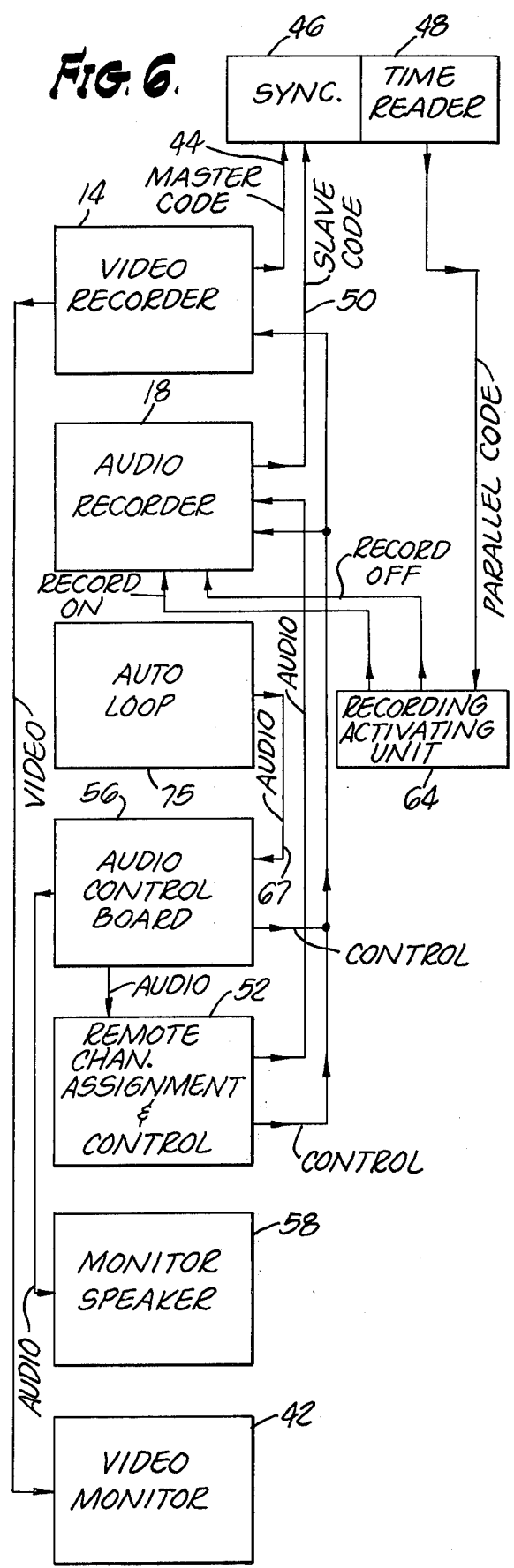

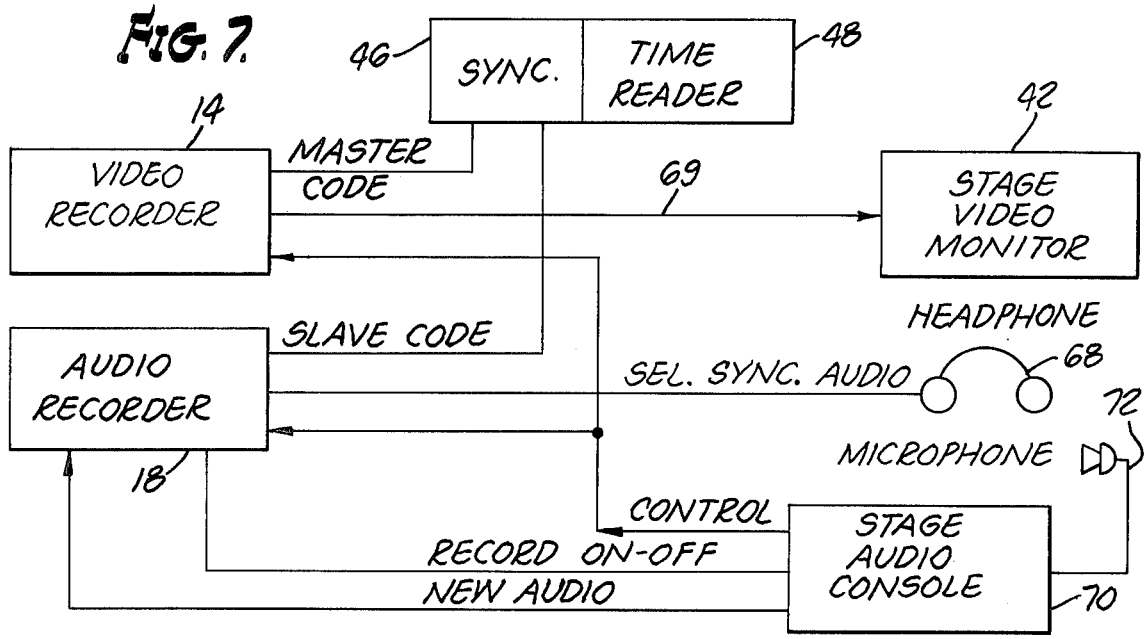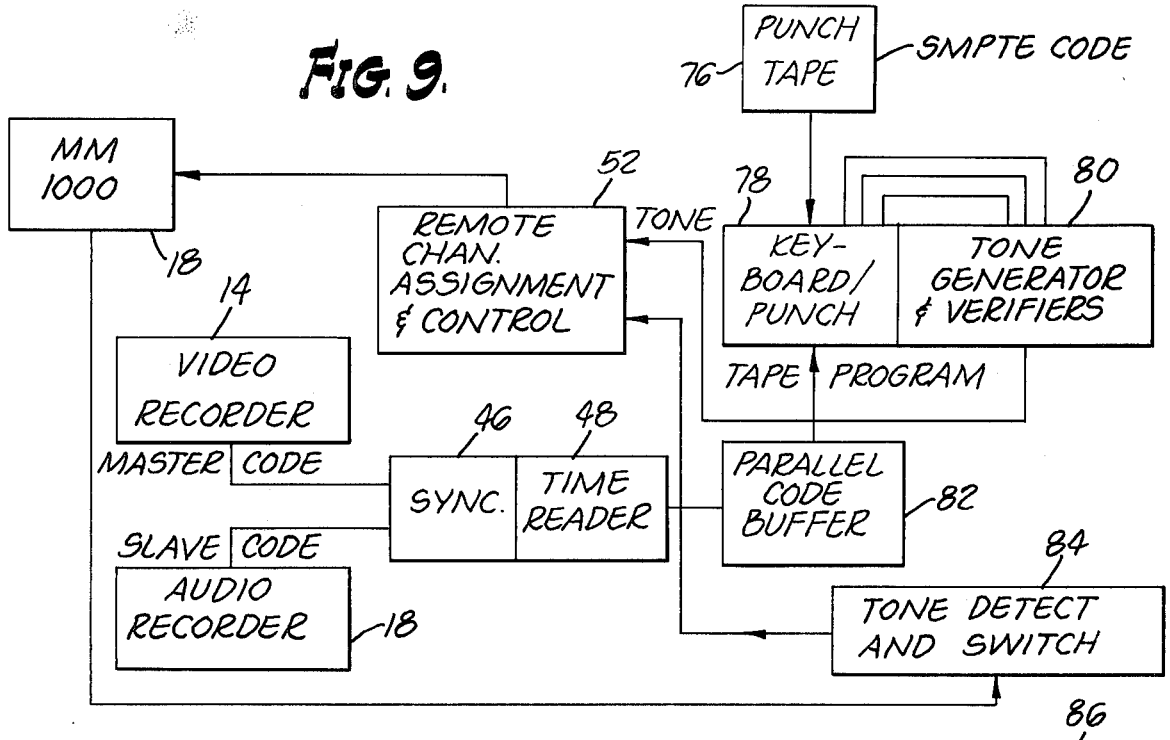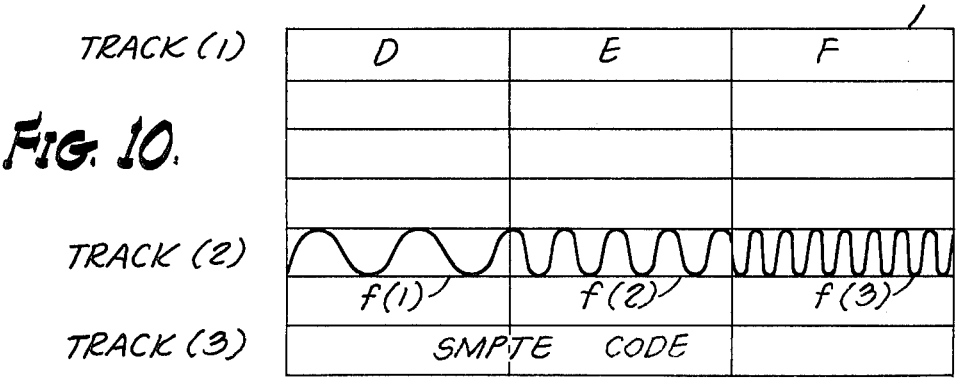

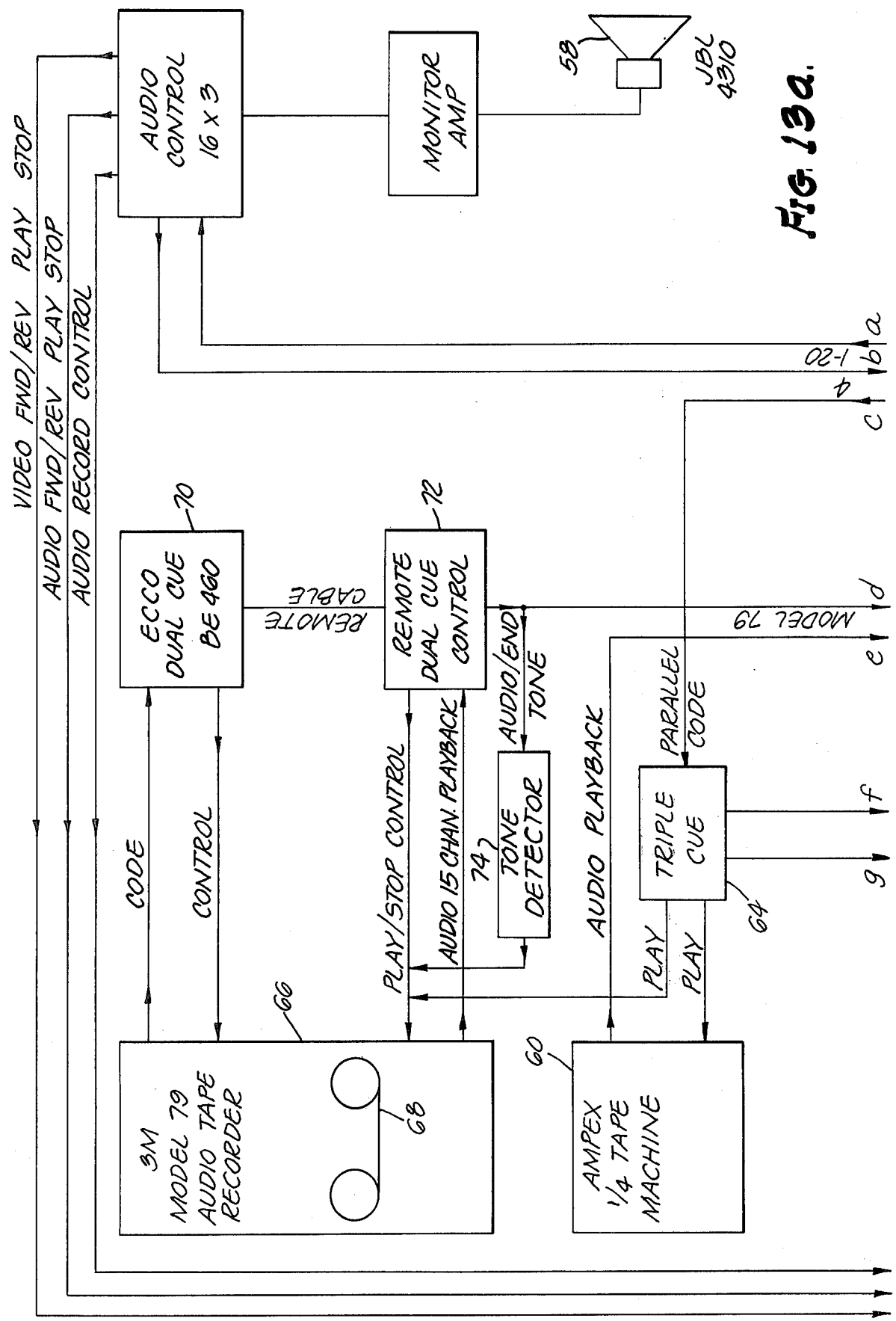

SOUND EDITING SYSTEM

BACKGROUND OF THE INVENTION

The present invention relates to a sound editing system, and more specifically, to an electronic sound editing system in which multi-channel audio tape recorders are used to transfer prerecorded sound effects located on either a sound "library" or other tape to selected locations on a master tape to create a composite sound track for use in association with a video display, such as a television program.

The prior method of editing a sound track and creating sound effects required an editor to run the dialogue track, recoreded initially during the filming of the work picture, with the producer in a projection room. An idea of the nature and quality of desired effects were obtained at this time. Also, decisions were made as to which lines of dialogue were to be replaced or altered in one manner or another. If video tape was being used, the editor and the producer would view the program normally using a one inch wide video tape copy made from the original two inch video master, on a video monitor. The video tape would also contain the dialogue.

Editing dialogue was achieved in the following manner. After viewing the dialogue track and work picture with the producer, the editor, with the use of a Moviola, would analyze the dialogue track for:

1. Abrupt changes in sounds which must be trailed off;
2. Holes or gaps in the background sounds which must be filled; and
3. Abrupt changes in the characteristic of a sound due to production circumstances or for effect, such as the filtering or toning known as "futzing" to simulate a telephone conversation.

The editor, using the code numbers that appear along the edge of the film and the assistant editors code book orders magnetic film reprints from a ¼ inch production tape which he needs for track extension and fills.

A variety of techniques are used for trailing off cuts, such as "feathering" the oxide on the film with a razor blade, or making a long diagonal splice into leader, or wiping the film with solvent. In those cases were abrupt changes in dialogue present problems for the person in charge of dialogue, characteristics, the sound editor will break the dialogue track apart and build a second or third dialogue unit to be later superimposed on one another.

Holes or gaps in the dialogue track were filled by locating a matching piece of background noise in the original track and inserting it in place of the gap. If the gaps or holes are large or very repetitive, the editor may elect to make a closed loop of magnetic film having the appropriate sound on it to be run repeatedly with the entire sequence in dubbing for background sound.

The sound editor attends the recording session in which the dialogue replacement sounds are made and has the actor read the original dialogue in synchronization with the picture. After the recording session for recording the new dialogue was completed the editor would build a dialogue unit using the new dialogue lines. When an automated dialogue replacement unit (ADR) is used the editor will delete the defective lines in the original dialogue track. During the dubbing session the new lines of dialogue, located on a separate reel, appear in place of the original dialogue that has been deleted.

Adding sound effects to a sound track is also required. Much of the sound effects selection process is dependent upon the creativity of the sound editor. Basically, however, sound effects are added:

1. When the sound pickup on the production effect is inadequate;
2. When sound effects are required to bridge cuts or fill gaps or holes in the same manner as the dialogue track treatment; or
3. When sound effects are needed to establish or enhance the feeling of time, location, physical conditions or mood.

There were three normal sources for obtaining the sound effects to be used along with the dialogue:

1. Production effects, in which case the editor orders scene reprints on magnetic file as required.
2. Stock effects from a "library," which are individually stored on thousands of small rolls of magnetic film and listed by number and type in a catalog. The editor must select the effects from the catalog he feels will work best, then take all of the small rolls to his editing room and run each one separately with the picture and cut dialogue track on a moviola to determine which of the sound effects works best. After selecting the correct effect the editor must send the selected rolls of sound recordings to the Transfer Deparment to have magnetic film copies made for compiling. These original rolls must be returned to the library room. This was a very time consuming process which must be repeated for each "library" sound effect desired.
3. Original sound effects recording may be necessary if an effect is required for which there is no effective prerecorded source. In such a case, the sound editor will actually make and record the desired sound. Normally, these sounds are made by the editor himself, and are performed as the editor watches a projection of the picture so that the sounds will be synchronous with the action without further editing. The creation of synchronous footsteps in the most obvious example of the kind of effect which the editor would want to record himself.

With the exception of the original sound effects recording, it was common for the added sound effects to require further editing in order for them to precisely match the visual display.

After the sound editor had obtained all of the sound effects needed for a particular visual sequence, the sound editor attempted to compile the sound effects into categories of sound in a manner that would make the Re-recording Effects Mixer's job as simple as possible. For example, common types of sound would be put on the same reel, or backgrounds would be built separately from impact effects, or if several different effects occurred in rapid succession, they would be separated into several tracks by type.

Included in the development, or "building," of the sound effect tracks was the assembling of constant sound into loops if they were to run for considerable lengths.

A critical portion of the "building" process is that the sound editor must mentally put himself in the Re-Recording Effects Mixer's place and determine if the tracks are "built" in the most practical manner for the mixer.

As the dialogue and sound effects reels were being "built," the sound editor makes out a cue sheet which records the elements contained in each reel and at what footage the individual sounds begin and end. In addition, instructional notations, such as where tracks should be faded, crossed with another effect, or "futzed" were recorded.

The above description makes it obvious that when the editor had finished editing the show he had accumulated numerous additional reels of magnetic film containing dialogue, effects and background loops for each original reel of picture and cut dialogue track. All of these additional reels required long hours to assemble, and when completed required as many magnetic film reproducers at the re-recording studio as there were reels. By the present invention the laborious and time consuming function of screening and compiling numerous individual sound effects is eliminated or greatly reduced.

A multi-channeled recorder has on it a tape recording contaning numerous sound effects. The location of each sound effect, indicated by digital address code and channel, are recorded in a log book for reference. The tape constitutes a "library" of sound effects and replaces the numerous individual reels of sound effects previously used. The sound recorded on the "library" are electronically transferred to a selected track of a second or master multichanneled audio recorder which contains the original dialogue and musical composition on separate tracks or channels. The "library" sound effects may be switched on and off at preselected locations to precisely transfer the sound effects from the library to a selected channel of the master multi-channeled audio recorder so that the transferred sound effect will be in synchronization with the visuals.

Before sound effects are recorded on the master tape the outputs of the library tape are fed to a remote channel assignment and control board where the sound effects may be equalized or otherwise modified before final recording of the sound effect on the final selected channel of the master tape.

The master audio recording and video tapes are imprinted with identical SMPTE time code for determining and synchronizing the relative position of the video and audio portions of the display.

Where one sound effect or dialogue of different characterization rapidly follows another in time a "track splitter" is utilized for transmitting selected portions of an individual track or channel of the master audio recorder to a selected input of the remote channel and control board, in order to permit the "mixer" to preset the necessary adjustments to the sound effect of dialogue as desired.

It is an object of the present invention to provide a sound editing system which is simple and efficient to operate.

It is another object of the present invention to provide a sound editing system which does not require compilation of a plurality of individuaal recording rolls.

It is still another object of the present invention to provide a sound editing system which permits rapid access to a plurality of sound effects.

It is yet another object of the present invention to provide a sound editing system which greatly reduces the amount of time required to provide sound effects and editing.

These and other objects of the present invention will be more evident from the following detailed description of the invention in association with the accompanying drawings.

BRIEF DESCRIPTION OF THE DRAWINGS

FIG. 3 is a block diagram of the set up of a portion of the system for dubbing with sprocketed film.

FIG. 4 is a block diagram of the portion of the system for making the cue sheet.

FIG. 5 is a block diagram of the portion of the system for editing and inserting dialogue.

FIG. 6 is a block diagram of the portion of the system for using an audio loop for inserting background sounds.

FIG. 7 is a block diagram of the portion of the system for inserting new lines of dialogue.

FIG. 9 is a block diagram of the portion of the system for splitting and switching recordings of tracks for assisting in mixing the recorded sounds.

FIG. 10 is an enlarged diagramatic view of a portion of three tracks of recording tape having information recorded for splitting the track.

FIGS. 13a, 13b are a block diagram of the entire system, patched together, portions of which are shown in FIGS. 1-12.

DETAILED DESCRIPTION OF THE DRAWINGS

Figure 1:
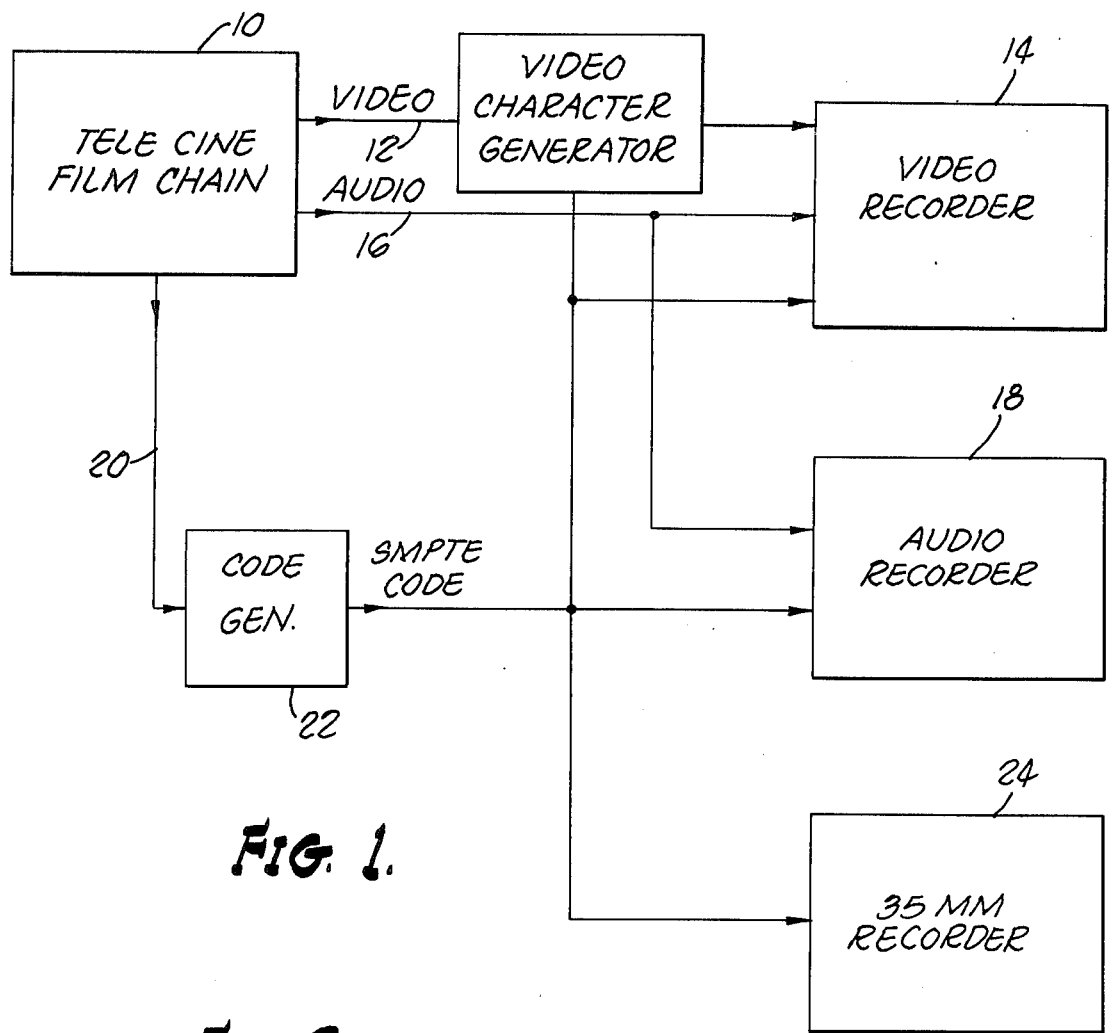
FIG. 1 is a block diagram of the set up of a portion of the system for use with sprocketed film.

Referring to FIG. 1 of the drawings, a portion of the sound editing system for use with sprocketed film is shown. A Tele-Cine film chain 10 has its video output 12 connected to the video input of a one inch video recorder 14, which, in the preferred embodiment, may be a commercially available IVC model 760 one inch Video Recorder which has been modified to permit operation in either a forward or reverse direction. The audio output 16 from the Tele-Cine film chain 10 is provided to the input of one channel of the video recorder 14 and to the input of one channel of a multi-channel audio recording and reproduction recorder 18, which in the preferred embodiment is a commercially available Ampex MM 1000 audio tape recorder operable in either a forward or reverse direction. An SMPTE time code generator, which, in the preferred embodiment, is a commercially available ECCO Model 520 SMPTE Time Code Generator 22, provides a binary code output recorded on a second channel of the video recorder 14, a second channel of the audio tape recorder 18 and on a 35mm recorder 24. An SMPTE video character generator is provided to record visual identification on the videotape. The video coding device in the preferred embodiment is a commercially available ECCO BE 400 Video Character Generator which superimposes the SMPTE code on the video recordings.

Figure 2:
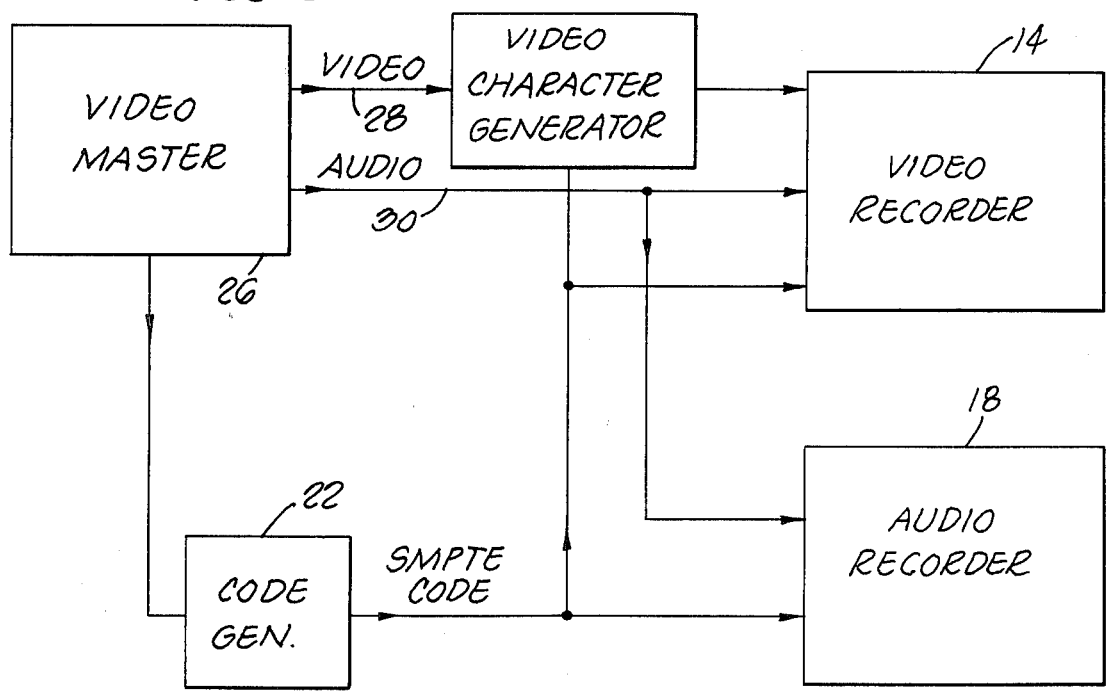
FIG. 2 is a block diagram of the set up of a portion of the system with video tape.

Referring to FIG. 2 of the drawings, which is a block diagram of the set up of a portion of the system for use with video tape, a two inch video master recorder 26 is shown with its video output 28 connected to the video recorder 14. One audio output 30 is connected to one channel of the video recorder 14 as well as to one channel of the audio tape recorder 18. A second audio output of the two inch video master recorder 26, which in the preferred embodiment is a commercially available VR 2000, is connected through coding device 22, for placement of the SMPTE code, to a second channel of the video recorder 14 and to a second channel of the audio tape recorder 18.

Referring to FIG. 3, which is a block diagram of the set up for a portion of the system for use in dubbing with sprocketed film, the audio tape recorder 18, has an audio output connected to an audio dubbing console 26. The audio tape recorder 18 is operated in synchronization with a 35mm reproducer master code device 28 which has its master code connected to the input of a synchronizer 30, which in the preferred embodiment is an ECCO BE 450 Wide Range Synchronizer. The slave code 32 from the audio tape recorder 18 is displayed on a edit time code reader 34 connected to the wide range synchronizer 30. The audio dubbing console control 36 has its output connected to the audio tape recorder 18, the 35mm reproducer master code 28, the 35mm recorder 24 and to a 35mm projector 38. The audio output of the audio dubbing console 26 is connected to the input of the 35mm recorder 24.

Referring to FIG. 4, which is a block diagram of a portion of the system for preparing the editing instructions or cueing sheet, a one inch video tape is placed on a video recorder 14, which in the preferred embodiment is an IVC Model 760, for viewing the video tape. The output of the video recorder 14 is connected to a video monitor 42 for viewing of the picture. A second output of the video recorder 14 provides a master code 44 connected to the input of the range synchronizer 46, which in the preferred embodiment is the ECCO BE 450 Wide Range Synchronizer. An edit time code reader 48 is connected to the synchronizer 46 for displaying the slave SMPTE code. The two inch tape of the audio is placed on an audio tape recorder 18, which in the preferred embodiment is an Ampex MM 1000 which has an output serving as the slave code 50 which serves as an input to synchronizer 46 and a second output connected to a monitor speaker 58.

The operation of the video recorder 14 is controlled by the output of a remote channel assignment and control board 52 which has an on-off switch, by a foot switch 54 and by the output of an audio control board having an on-off switch 56. The audio tape recorder 18 is also controlled by foot switch 54 remote channel assignment and control board 52 and audio control board 56. Should either the audio tape recorder 18 or the video recorder 14 be deactivated, the other is deactivated.

Referring to FIG. 5 of the drawings, which is a block diagram of the portion of the system for editing and inserting dialogue recorded on ¼ inch production tape, again as in FIG. 4 a one inch tape is placed on a video tape recorder 14 having its output displayed on video monitor 42. The two inch audio tape is placed on the audio tape recorder 18. The master code provided from the video tape recorder 14 is connected to the synchronizer 46 while the slave code 50 provided from the audio tape recorder 18 is also connected to the synchronizer 450. The slave SMPTE codes are displayed on the edit time code reader 48.

The audio output 65 of audio tape recorder 18 is connected to the input of remote channel assignment and control panel 52. Audio tape recorder 18 and video tape recorder 40 are controlled by the outputs of remote channel assignment and control 52 as well as audio control board 56. A recording activating unit 64 (described in greater detail in reference to FIG. 12) having switches A for starting the rotation of the onequarter inch playback recorder 60, switch B for activating audio tape recorder 18 and switch C for deactivating audio tape recorder 18 has an input from the edit time code reader 48. The audio output 62 of the one-quarter inch playback recorder is connected to the input of audio control board 56 which has an audio output connected to monitor speaker 58 and to remote channel assignment and control board 52.

In FIG. 6, which is a block diagram of the portion of the system for using an audio closed loop for inserting background sounds, the set up is essentially the same as that described in FIG. 5 with the exception that in place of the one-quarter inch playback recorder 60 an auto audio loop 66 is inserted. The audio output of the auto audio loop 66 is connected to the input of audio control board 56. Recorder activating unit 64 having an input from the edit time code reader 48 has only two switches B and C for starting and stopping the recording of the two inch audio tape recorder 18. No starting switch A, as indicated in FIG. 5, is required in the auto loop since the auto loop is continuously moving.

Referring to FIG. 7, which is a block diagram of the portion of the system used for inserting loop lines of dialogue onto the master recording, the one inch video tape recorder 14 has its output connected to the synchronizer 46 for providing a master code while the two inch audio tape recorder 18 has an output providing the slave code is connected to the input of the synchronizer 46. The slave code is displayed on the edit time code reader 48. The video tape on video tape recorder 40 is displayed on video monitor 42. The original dialogue track of the audio tape recorder 18 is connected to a pair of head phones 68 which are in synchronization with the video display on monitor 42. The video tape recorder 40 and the audio tape recorder 18 are controlled by a stage audio console 70. The stage audio console also has outputs connected to the audio tape recorder 18 for controlling the recording of sound from the microphone 72 on separate channels of the audio tape recorder 18.

Figure 8:
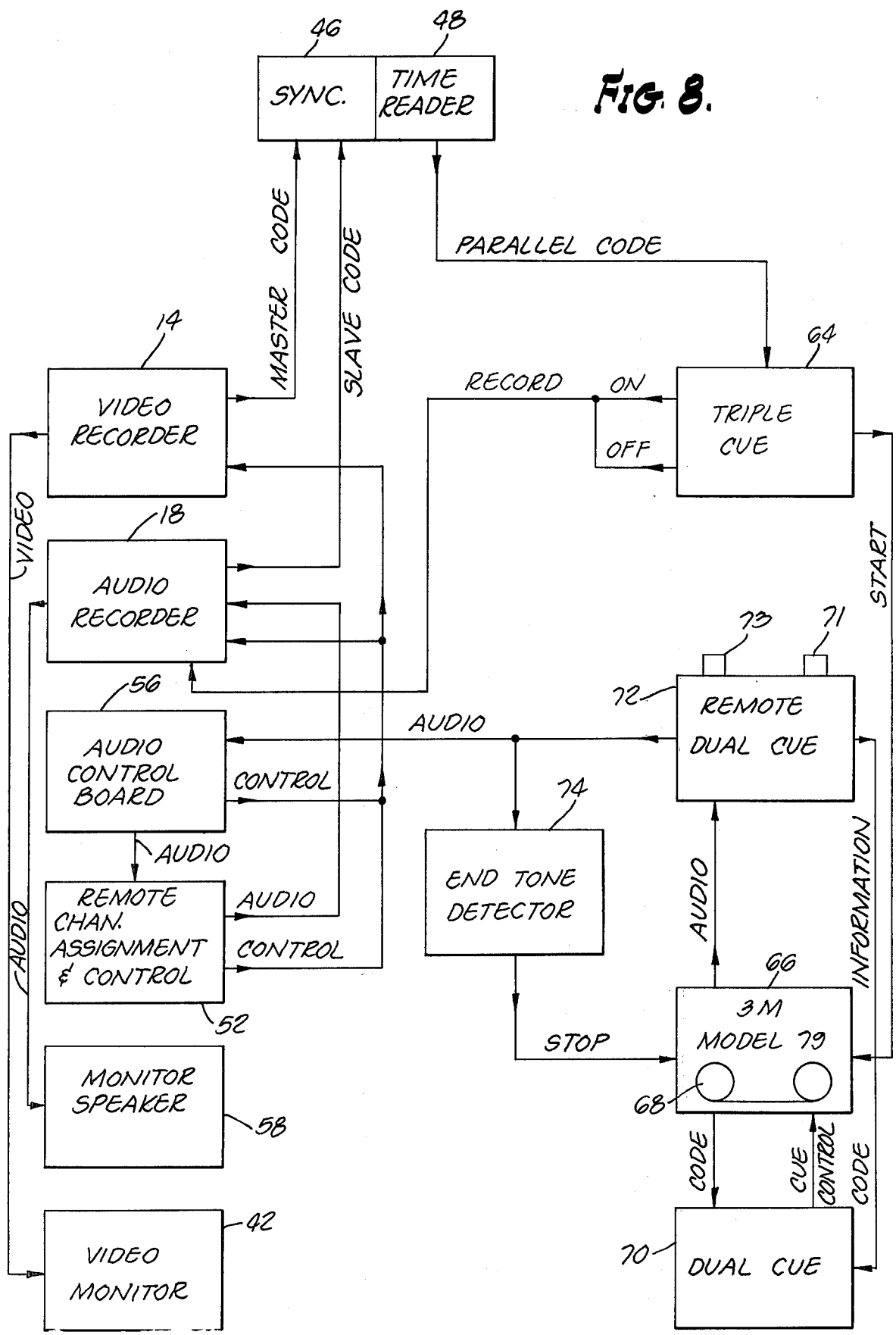
FIG. 8 is a block diagram of the portion of the system for editing and inserting sound effects.

Referring to FIG. 8, which is a block diagram of the system used for editing and inserting sound effects on the audio tape recorder 18, video tape recorder 14 and audio tape recorder 18 have their outputs for providing a master and slave code respectively connected to synchronizer 46. The slave code is displayed on edit time code reader 48 while the master code is displayed on the video monitor 42. The video display from video recorder 40 is displayed on video monitor 42 while the audio portion of audio recorder 18 is heard over speaker 58.

The operation of the audio recorder 18 and the video recorder 14 are controlled by remote channel assignment and control panel 52 and audio control board 56. The recording activating unit 64, having an input from the edit time code reader 48, has on-off switches B and C for controlling the recording of audio tape recorder 18. Start switch A of recording activating unit 64 is connected to the input of a multiple track tape recorder 66, which in the preferred embodiment is a 3M Model 79 Multiple Track Recorder which has a two inch multi-tracked tape 68. The multi-track tape recorder 68 is controlled by a dual cue controller 70, which in the preferred embodiment is an ECCO BE 460 Dual Cue Controller, which is in turn controlled by a remote dual cue keyboard 72 for activating the dual cue controller 70 to search for a particular location of the multi-channel tape recorder 66.

The audio from the multi-channel tape recorder 66 is connected to the input of the remote dual cue keyboard 72 which in turn has its audio output connected to the audio control board 56 and to an end tone detector 74. The end tone has a control output connected to the multi-channel tape recorder 66 so as to deactivate the multi-channel tape recorder 66 on detection of a tone.

The two inch tape 68 placed upon the multi-channel tape recorder 66 has prerecorded on various tracks at various locations sound effects, recorded from a sound effects library. This two inch multi-track tape 68 serves effectively as a sound effects "library." At the end of each individual sound effect a low frequency tone is present on the recording tape which is detected by the end tone detector for stopping the multi-channel recorder 66.

Referring to FIG. 9, which is a block diagram of a portion of the sound editing system used for splitting an individual track into discrete segments and switching the segments to designated controls on the remote channel and control board 52. A punch tape 76, having information relating to the SMPTE code numbers and channel switching information is fed into a punch tape reader 78 with its BCD output plugged into the keyboard/punch tape programmer. The output of the tape reader is connected to the input of a tone generator and verifier 80. The output of the tone generator 80 is connected to the remote channel control panel 52. The keyboard/punch tape programmer is provided with the output of a parallel code buffer 82 which receives the output of edit time code reader 48 which displays the slave code of audio tape recorder 18.

In FIG. 10 an enlarged diagrammatic view of a portion of tape showing three tracks having information for assisting in the splitting of the tracks is shown. Track (1) illustrates three segments of sound effects or dialogue D, E and F contained on one track. Illustrated on Track (2) of the tape 86 are represented three frequency tones generated by tone detector and switcher 84, F(1), F(2) and F(3) immediately below the corresponding sound effect on track (1). Track (3) of tape 86 contains the SMPTE code recorded earlier.

Figure 11:
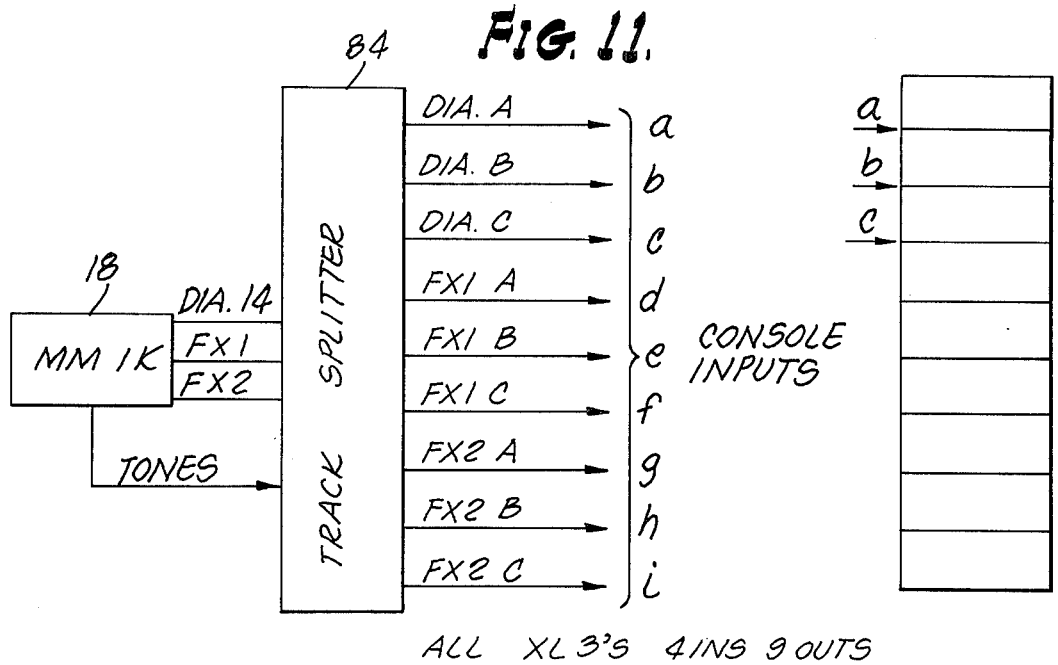
FIG. 11 is a block diagram of the portion of the system used for splitting a track and directing segments of the split track to a control console.

Referring to FIG. 11 the block diagram of the track splitter illustrates the connection of the outputs of the track splitter to the inputs of the remote channel assignment and control board 52 which operates upon the audio outputs by the use of potentiometers.

Figure 12:
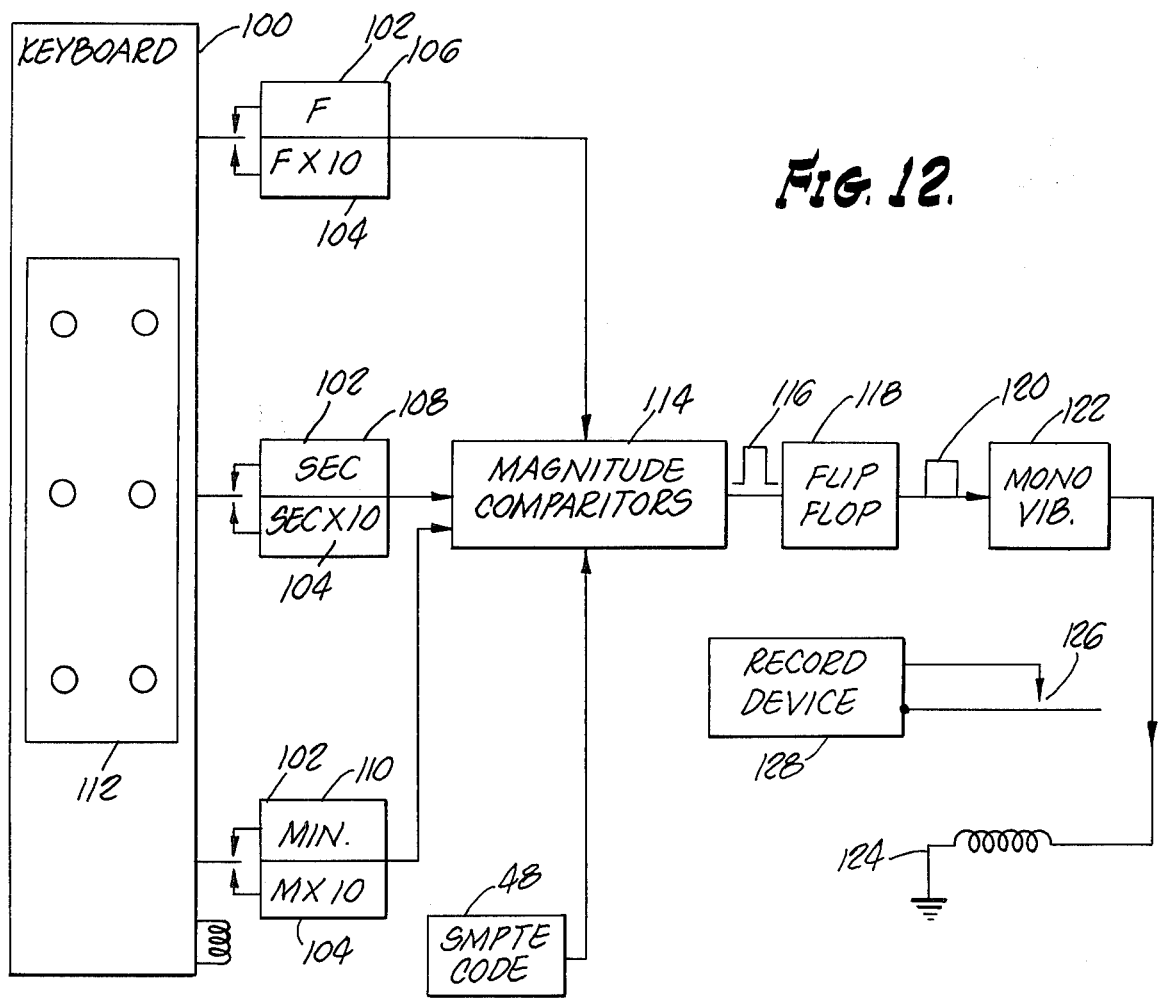
FIG. 12 is a block diagram of the portion of the system for the recording activating unit.
Figure 19B:
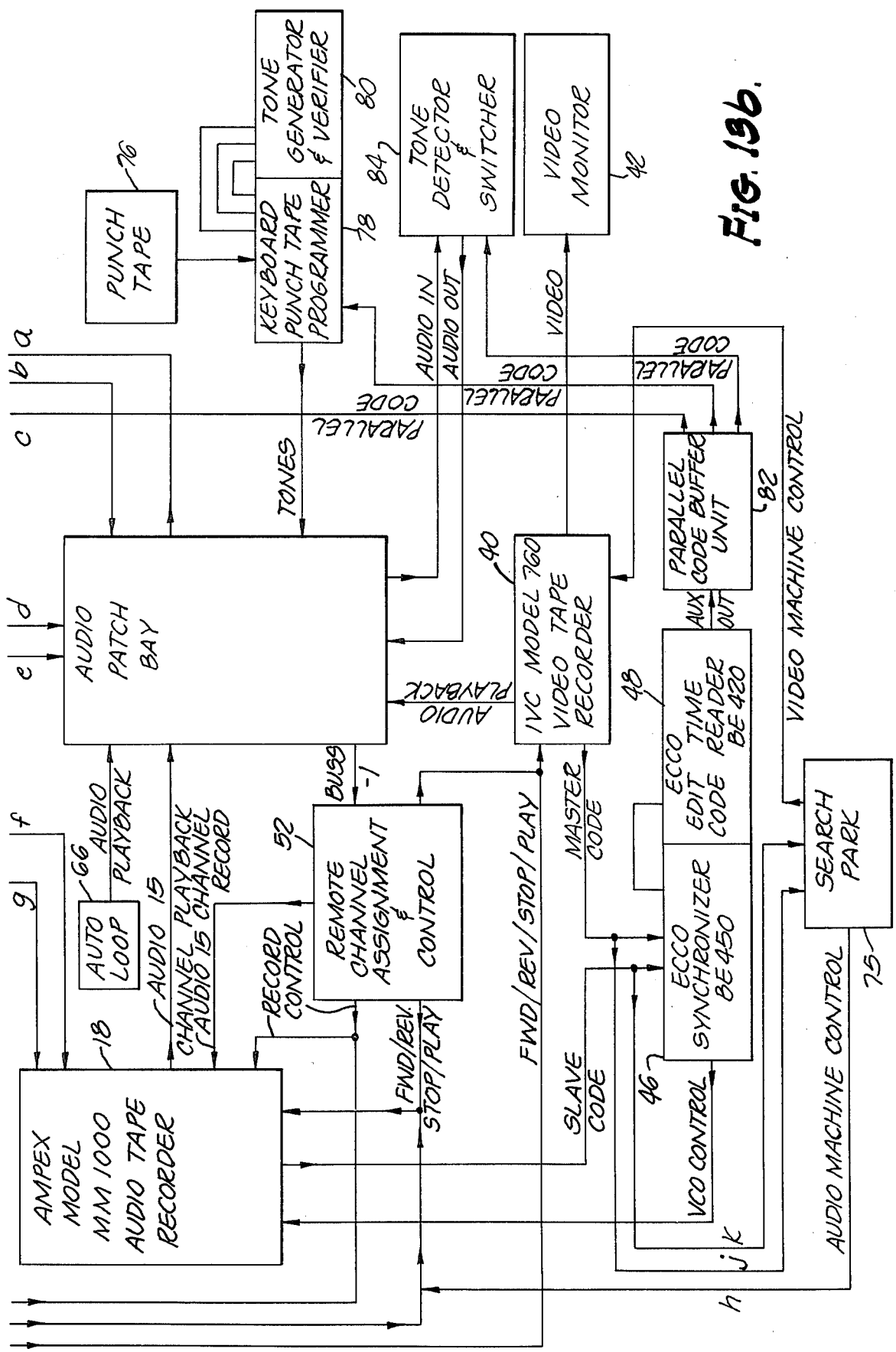

Referring to FIG. 12 which is a block diagram of the recording activating unit 64, a keyboard 100 is shown having LED displays 112. Bistable latch circuits 102 and 104 store the cue information of frame, seconds and minutes. The cue information is shown on LED's 112 connected to the bistable latch circuits. The outputs of the bistable latch circuits are connected to a magnitude comparator 114, which has as an input the SMPTE code provided for edit time code reader 48. The output of the magnitude comparator 114 is connected to flip-flop 118 which has its output connected to monostable multi-vibrator 122. The vibrator 122 has its output connected to a coil 124 for activating a switch 126.

OPERATION OF THE SYSTEM

The operation of the preferred embodiment of the present invention is as follows:

If the original recording is sprocketed film and the finished product is also to be sprocketed film then a one inch video tape copy of the film to be used as a work print is made using a Tele-Cine film chain and a videotape recorder such as a commercially available IVC Model 760 Videotape Recorder.

As shown in FIG. 1 at the same time that the film copy is being made, the sprocketed cut dialogue audio track will be recorded on channel 14 of the audio tape recorder 18 which typically has 16 tracks, and channel 2 of the video recorder 14 in synchronization with the picture which is recorded on a second channel of the video recorder 14. Also, while the copies are being made, the SMPTE Edit Time Code from the edit time code generator 22 is recorded on channel 16 of the audio tape recorder 18, on a void channel 1 and, by-passing the code through the video character generator 20, in the video information of the one inch video recorder 14 and on a single track of 35mm audio sprocketed film recorder 24. The SMPTE Edit Time Code is used to keep the video 14 and audio 18 tape machines in synchronization during dialogue and effects editing. The coded 35mm sprocketed film is used to keep sprocketed film machines 24 and 28 and the audio tape machine 18 in synchronization during dubbing as shown in FIG. 3.

If the final product is to be video tape then a one inch video tape copy is made from the two inch video master and the SMPTE code and dialogue tracks from the master video tape are transferred in synchronization to the video recorder 14 and the audio tape recorder 18 on the same channels as described above. No sprocketed film code is required.

Referring to FIG. 4, after the viewing of the sprocketed picture or video tape with the producer, the one inch video tape now containing the SMPTE code is placed on the video recorder 14 for viewing on a video monitor 42. The two inch audio tape is placed on the audio tape recorder 18 to allow the editor to analyze the dialogue track at the same time.

The SMPTE code tracks from the one inch video tape on the video recorder 14 and the two inch audio tape located on channel 16 of the audio tape recorder 18 are patched into the wide range synchronizer 46 serving as master 44 and slave 50 code inputs respectively. The synchronizer 46 automatically adjusts the slave audio tape on the audio tape recorder 18 until the slave tape is synchronized with the master tape. This assures the editor of frame accuracy between the two tape machines 14 and 18. The master SMPTE code is displayed in the lower portion of the video picture on the monitor 42 and the slave SMPTE code is displayed on the edit time code reader 48.

The editor then proceeds to analyze the dialogue track in synchronization with the video picture by starting the audio and video machines in the forward play direction with either a forward switch (not shown) located on the audio control board 56 or on the remote channel assignment and control unit 52. When the editor observes a spot where there is a problem with the dialogue, he depresses the foot switch 54 that stops both the audio 18 and video 14 machines instantly. The frame of the picture remains displayed on the video monitor 42 through the conventional "stop frame" circuitry of the video recorder 14.

The editor then manually rotates the supply and take-up reels of the video recorder 14 until the particular frame he desires appears on the monitor 42. This frame of picture will also have the SMPTE code displayed in the lower portion of the picture. The above procedure is referred to as "spotting."

As the dialogue and sound effects locations are being determined, the sound editor makes out an editing or cueing sheet which describes the location and trouble contained in the audio recording. The SMPTE code number (example 01:21:13:04) is recorded on the editor's cueing sheet with an explanation as to what has to be done to the dialogue at this point. The "spotting" continues until the editor has listed all of the areas that need correcting.

If the one inch video tape has been recorded using the Tele-Cine film chain, there will appear additional numbers vertically along the edge of the picture. These numbers are called code numbers and are used by the editor to locate the appropriate recordings on the one-quarter inch production tapes.

Following the "spotting" of the picture and audio, the editor orders the necessary reprints from the one-quarter inch production tapes which he will need for track extension and the filling of gaps.

As shown in FIG. 5, track extension is accomplished by using the one-quarter inch recording of the same scene noted as having trouble which contains the additional words required. The one-quarter inch recording of the scene is placed on a one-quarter inch playback machine 60 and then re-recorded on an additional track of the audio tape recorder 18 in synchronization through the use of the recording actuating unit 64, remote channel assignment and control unit 52, the audio control board 56, the synchronizer 46 and the edit time code reader 48.

In operation the one-quarter inch recording is placed on the one-quarter inch playback tape machine 60 and set at a point that will allow it to be up to speed when the recording on the audio tape recorder 18 is to be made. The audio output 62 from the one-quarter inch machine 60 is patched to the input of the audio control board 56 for volume control. The output of the audio control board 65 is patched to the input of the remote channel assignment and control unit 52 for selection of the correct channel of the audio tape recorder 18 for the recording. The point that the one-quarter inch machine 60 is to start is taken from the editor's cue sheet notes.

Using an entry keyboard located on the recording activating unit 64 and the SMPTE time code from the audio tape recorder 18 as a reference, the start point for the one-quarter inch tape is entered into the A bistable latch circuit of the recording activating unit. The start of recording point of the audio recorder 18 is entered into the B latch circuit, and the stop record point is entered into the C latch circuit. The latch circuits A, B, C are set and the audio recorder 18 and the video tape recorder 14 are put in play mode. When the first entered cue point corresponding to the bistable switch A is reached the one-quarter inch machine 60 starts. When the cue point corresponding to bistable switch B is reached the record bias of audio tape recorder 18 is turned on for the preselected channel and the recording on the one-quarter inch tape is transferred to the tape on the audio recorder 18. When the third cue point, corresponding to bistable switch C, is reached the record bias of audio recorder 18 is turned off.

The recording activating unit 64 is designed to control the starting, stopping and on and off recording of the audio 18 and video 14 tape machines at accurate locations, in accordance with the SMPTE code.

This is accomplished by entering binary information through the use of a keyboard 100 into bistable latch circuits 102 and 104 located on printed circuit boards. Each circuit board contains 2 bistable latch circuits, one for units and and one for tens count. Three of the circuits 106, 108 and 110 boards are required for each machine control. As an example circuit board 106 contains frames and frames times 10, board 108 seconds and seconds times 10, board 110 minutes and minutes times 10. As the binary information is entered into the circuit boards, the entered information is displayed on LED readouts 112, allowing the operator to verify the information entered into the circuit boards.

The circuit boards contain additional circuitry consisting of two 4 bit magnitude comparators 114 which perform magnitude comparison of straight binary and straight BCD (8421) codes to compare the keyboard entered information in the bistable latch circuits with that of the SMPTE parallel code being received from the edit time code reader 48. When the SMPTE parallel code from reader 48 is equivalent to the code stored in the bistable latch circuits 102 and 104, the magnitude comparators 114 produce an output pulse 116 for the duration of time that those two codes are equivalent. The output pulse 116 is wired to the input of a master-slave flip-flop 118 located on a second circuit board. When the pulse 116 is received, the flip-flop 118 changes state and produces a pulse 120 activating a monostable multivibrator 122 which in turn activates the coil 124 of a relay also located on the second circuit board. Activating the relay 124 causes closure of a contact 126. This contact closure is used to either start, stop, turn on or turn off the appropriate recording device 128.

The recording activating unit contains three complete circuits of the type described above thus allowing three independent output controls, such as A, B and C shown in FIG. 5.

Holes in the dialogue track are handled in a manner similar to the track extension operation discussed in reference to FIG. 5, above, except that instead of using the one-quarter inch tape machine 60 to reproduce the information for recording on the audio tape recorder 18 a device known as an auto audio loop 75 is used, as shown in FIG. 6. Here the background noise required is recorded on small continuous closed loop cartridges as short as 3 seconds and long as one hour in length. The audio output 67 of the auto audio loop 75 is then reproduced, through the audio control board 56 and remote audio control unit 52, and recorded at the desired locations on an open track of the audio tape recorder 18 using the recording activating unit 64 for control. Since the loop is running continuously no start switch A is required, only the record-on switch B and off switch C cue settings being required.

The insertion of loop lines are handled in the following manner, making reference to FIG. 7. The one inch video tape and the two inch audio tape are taken to the recording booth used for video-audio sweetening and placed on the video tape recorder 14 and audio tape recorder 18, respectively. The booth is located next to a sound stage designed for live microphone pickup used for recording the replacement dialogue.

The SMPTE code from the video recorder 14 and the audio recorder 18 are again patched into the synchronizer 46 master and slave inputs respectively, to maintain synchronization between the two machines. The video output 69 signal from the video recorder 14 is connected to a video monitor 42 on stage. The original dialogue track output from the audio tape recorder on channel 14 is connected to a pair of headphones 72 on the same stage, and played back to the performer in synchronization with the picture from the selective synchronization output of the audio recorder 18. The microphone 72 used for recording is patched into an audio console 70 located in a sound-proof booth on the same stage. The video picture along with the original audio track that requires replacement are played for the performer. The audio 18 and video 14 tape machines are then reversed to a point ahead of the scene requiring replacement, and then played forward again in synchronization. The performer, under the direction of the editor, attempts to duplicate the original synchronization reading. This new reading is recorded on an unused track on the audio tape recorder 18 in synchronization with the picture displayed on the video monitor 42. If the first reading is incorrect the process is repeated and recorded over the same area of the same track automatically erasing the incorrect recording.

During the "spotting" of the show the editor's notes on the editing or cue sheet indicate where and what kind of additional sound effects will be required.

Production effects are identified by the editor, (using the vertical code numbers on the picture if the one inch copy was made from the film chain) and located on the production one-quarter inch tape. The appropriate one-quarter inch production tapes are placed on the one-quarter inch playback machine 60 and again, as was done with dialogue, transferred to the selected channel of the audio tape recorder 18 in synchronization with the picture, using the synchronizer 46 the edit time code reader 48, the recording activating unit 64, audio control board 56 and the remote channel assignment and control unit 52 in the same manner as discussed in reference to FIG. 4.

Stock sound effects are contained on two inch, 16 channel rapid access audio tape library rolls 68, with a code recorded on channel 15 of the library tape 68. The sound effects contained on these rolls and the code number of each of their locations are contained in a library effects catalog.

Referring to FIG. 8, the editor, with the use of the effects catalog, will locate the effects he feels will be best suited for the individual scenes. With the effects library roll loaded on the multi-channeled tape recorder 66, which in the preferred embodiment is a 3M Model 79, sixteen track reproducer, he will listen to the effects he has chosen to determine if the sound effect will fit the scene. This is accomplished with the use of the dual cue controller 70, the remote dual cue programmer 72 and the audio control board 56 in the following manner.

Using the code information obtained from the library catalog, the editor enters this information into the dual cue controller 70, which in the preferred embodiment is an ECCO BE 460 dual cue controller, through the use of the remote dual cue unit keyboard 72. The information entered is stored in the memory of the dual cue 70.

The editor next presses the "cue" button 71 on the remote dual cue unit 72 causing the multi-channeled recorder 66 to go into high speed search. When the cue point is reached the multi-channeled recorder 66 will park and wait for the next command. In this case the editor will press the "play" button 73 located on the remote dual cue unit 72. The recorder 66 then operates in its standard play mode. The audio channel of the multi-channeled recorder 66 selected will then be reproduced through the audio control board 56 for level and volume control and heard through the monitor speaker 58.

At the end of each sound effect on tape 68 a short burst of low frequency tone (25 Hz) is present. This tone, which may be inserted by means of a number of conventional tone generators or devices, is used by the end tone detector unit 74 to stop the multi-channeled recorder 66 automatically following each sound effect. The process of checking the preselected sound effects continues until the editor is satisfied that he has the exact sound effects he needs. The sound effect code numbers are then listed next to the corresponding SMPTE code numbers on the editors cue sheet.

Following the selection of sound effects from the sound effects library 68 the editor is ready to transfer the sound effects to the audio recorder 18. Referring to FIG. 8, the procedure for the transfer is as follows.

The two inch tape containing the original dialogue and the one inch video tape are set at a corresponding point ahead of where the sound effect is to be recorded. The precise point depends on the start-up time of the unit.

One method of accomplishing this is with the search and park controller 77. The search and park controller is designed to program two tape machines, one audio tape recorder 66 and one video tape recorder, simultaneously or individually in the proper direction and stop them at the preselected cue points. Cue points are programmed by a keyboard entry located on the front panel. The selected cue point is displayed on six LED readouts. Time control boards use the cue point and SMPTE edit time code decoded from the recorder tapes by a time code reader to pulse a logic control board to control the direction and stop point of the machines.

Operator controls and indicators are located on the front panel. LED displays are located on the upper front panel. The keyboard is designed to enter the desired cue point into the bistable latch circuits of the time code boards. The fast forward or rewind switches located on the front panel are then depressed for each machine depending on the direction required to reach the cue point. The machines then proceed in the selected direction at high speed until the cue point is reached. When the cue point is reached the first time the magnitude comparators located on the time control boards pulse the control board circuit which in turn pulses the logic control board causing the machines to reverse direction. The machines decelerate and reverse direction and proceed in this new direction until the cue point is again reached. At this time the magnitude comparators again pulse the control board and they in turn pulse the logic control board which applies a stop signal to the machines.

Additional switches located on the front panel allow for manual, remote play or stop control of the machines. Also located on the front panel is an auto-manual switch that disables the automatic switching logic circuit when in manual position, thus preventing the machines from going into high speed search when only the normal play mode is desired.

While the audio 18 and video 14 machines are searching or after they have reached their cue point, the multi-channeled recorder 66 containing the "library" roll 68 is programmed with the dual cue 70 and remote dual cue unit 72 to the required sound effect, using the code numbers from the editors cue sheet as a reference.

Next, using the keyboard on the recording activating unit 64, described above, the play-start point for the multi-channel recorder 66 is entered into latch circuit A. The record on and off for the audio tape recorder 18 are entered into latch circuits B and C respectively, using the SMPTE time code from the audio 18 or video 14 recorders as a reference. Latch circuits A, B and C are armed. The audio 18 and video 14 recorders are placed in the forward play mode using the forward control switch located on the audio control board 56 or on the remote channel assignment and control unit 52. When the first cue point corresponding to latch A is reached the multi-channeled recorder 66 will start; the second cue point, B, will turn the record bias on for the selected channel; and when the third cue point is reached the bias will be turned off, completing the transfer of the sound effect from the library roll 68 to the tape on the audio recorder 18. When the low frequency tone burst on the library roll 68 following the sound effect is detected by the tone detector unit 74 the multi-channeled recorder 66 will stop.

After the new dialogue and sound effects have been recorded on the required open tracks of the audio tape recorder 18 the editor is ready to perform the final editing step, that of having the electrical tones required for electronic switching by a track splitter recorded on the control track (channel 15) of the audio tape recorder 18.

Making reference to FIG. 9, the track splitting operation is as follows: The editor, using his cue sheet as a reference, types out a punch tape 76 on a teletype machine (not shown). This tape will contain SMPTE code numbers that correspond to the code numbers located on channel 16 of the audio recorder 18 and data to be used to program the electronic switching of the original dialogue track between a plurality of inputs on the audio recording console 52, for separate equalization, the switching out of the original dialogue, the switching in of the new loop lines, or the new dialogue that was recorded for track extension. Also, sound effects and background nose can be switched in and out at predetermined points.

The punch tape 76 is then placed on an ECCO punch tape reader 78 with its BCD output plugged into the keyboard/punch tape programmer. The programmers output is plugged into the tone generator and verifier 80. The output of the tone generator is patched into the control panel 52 for amplification prior to being recorded on channel 15 of the audio recorder 18. Also patched into the keyboard/punch tape programmer 78 is parallel code from the parallel code buffer unit 82. The parallel code informs the programmer 78 of the code position of the two inch audio tape recorder 18.

When the code reaches a point that coincides with the code on the punch tape, the tone generator 80 produces a set of tones of given frequencies. The tones are then recorded on the audio recorder 18 control track 15 for the required duration. The punch tape reader 76 then advances the tape to the next information coded on the punch tape and when the two inch code and tape reader code again coincide another set of tones are produced from the tone generators and recorded on the same track of the audio recorder 18.

The cue sheet compiled by the sound editor contains the address and switching functions desired. A sample format is illustrated below:

| Mins | Secs | Frms | A | B | C |
|------|------|------|---|---|---|
| 01 : | 59 : | 29 | 0 | 5 | 9 |

This means "at 1 minute, 59 seconds and 29 frames, mute (0) signal from "A" channel, direct signal from "B" channel to console input (5), and direct the signal from "C" channel to console input (9). Hold these functions until next instructions." The cue sheet may be handwritten or, if typed, a punched tape is made at the same time.

The tone generator 80 consists of audio oscillators and in the preferred embodiment 3 switch decoders. Visual display of the tones generated are provided on the face of the panel by LED's. Verifier 80, receives the tones from the audio recorder 18 and verifies by a visual display that the proper tones are being recorded.

One channel of the audio tape recorder 18 is used as a memory element for recording the switching tones. This provides flexibility as to the type of format to be used, from the simple presence or absence of a tone to control a switcing such as the "electronic a/b key" or a "minus dialogue maker." The use of encoded multiple tones provides the ability to perform many complex functions. The bandwidth (approximately 20 hz to 20 khz) of the recording tape is relatively large and it is possible to assign one frequency for each function desired. Programming is thus very simple. The "control track," can be prepared in several ways, the choice depending on the complexity of the program. Shows requiring only single tones, and on which switching accuracy is not critical, may be prepared by manually keying the tone while viewing the show. Greater accuracy requires the use of either a thumbwheel or keyboard "syncue." Complex shows require the use of the punched tape which automatically switches the outputs of the tracks. In some cases, this final programming of the control track can be done at double speed, i.e., 30 ips. The system is self-checking so errors can be detected and corrected before the master goes to dubbing. Corrections are easily made using any of the above methods of preparation. Once a control track is prepared, it is an integral part of the master.

Combinations of three tones are needed to encode required data. Two other tones (lowest and highest frequency) are also recorded and act as guard tones. If the reproducer is not running at proper speed, as during synchronizing, the guard tones will be off-frequency and switching is inhibited. Both of the guard tone frequencies must be present to enable switching functions. This prevents erroneous switching from off-frequency tone during off-speed conditions. The following tables are the selected frequencies used in the preferred embodiment for switching:

TABLE A

| Frequencies Selected | |
|---|---|
| 300 hz | Guard Tones |
| 7000 hz | |
| 600 hz | Group A |
| 800 hz | |
| 1050 hz | |

TABLE A-continued

| Frequencies Selected | | |
|---|---|---|
| 1450 hz  1850 hz  2500 hz | Group B | Any one or none from each group, plus guard tones. |
| 3400 hz  4500 hz  6000 hz | Group C | Five tones, maximum, at any time. |

Referring to FIG. 10 a diagrammatic view of a recording tape having the switching tones recorded thereon is shown. Track (3) contains the SMPTE code, while track (1) contains the dialogues or sound effects D, E and F to be modulated or futzed or otherwise acted upon. Track (2) contains the tones generated and recorded on the audio tape of the audio recorder 18. The punch tape activates the tone generator 80 to generate a tone having frequency $f(1)$ during the time dialogue or sound effect D is present. In the same manner, frequencies $f(2)$ and $f(3)$ are generated during segments E and F respectively. The SMPTE code ensures the proper locating of the frequency tones.

Referring to FIG. 11, it may be seen that upon the tone detector detecting a particular frequency tone on track (2), the selected track is switched so that the audio output of the audio tape recorder 18 is fed to the input of the selected console potentiometer. Thus, the audio outputs of track (1) are transmitted to one potentiometer of console 52 for the duration of dialogue D, to a second potentiometer for the duration of dialogue E and a third potentiometer for the duration of dialogue F.

The other tracks on the audio recorder 18 that will require electronic switching are also patched into the track splitter, and their outputs electronically switched to the proper potentiometer of the audio recording console 52 depending on the presence of a particular switching frequency tone.

During the final mixing session the frequency tones on the control track will be reproduced and the track splitter as it senses the different tones will electronically switch the correct inputs and outputs. As an example, during the first recorded tone the original dialogue track will appear on input number one of the audio console 52 with equalization set for that particular character. When the next frequency tone appears the original track will appear on input number two, and input number one will be muted. Thus, it is possible to use different types of equalization and level for the two characters recorded on one track without having to record one character and then back the systems and record the second character. Sound effects are handled in the same way; when the new sound effect is switched in the old one on the original track is switched off or a new background noise may be switched in and out as needed. This permits the mixer to avoid having to make extremely rapid variations in the potentiometer or other controls in order to equalize the audio received from the audio recorder 18. Each of the channels can be split into a number of parts, wherever rapid changes in equalization occurs, and each potentiometer setting selected separately and left undisturbed while the next potentiometer is set.

Upon completion of recording the tones for electronic switching, the editor will make out a new cue sheet for the mixer. This cue sheet will inform the mixer as to what channel each new dialogue and sound effect has been recorded on and using the SMPTE code as reference to what time these new recordings will appear. Under comments, the editor will describe what these new recordings contain and how they should be handled. Also, listed on the cue sheet are the tracks that will be controlled by the track splitter and at what time the switching will take place. Other methods of "switching" are possible, such as using the presence or absence of a signal to cause switching.

A microprocessor, with enough memory, could store addresses and functions in a look-up table. Parallel time code would be presented and compared with the contents of the look-up table. The look-up table would be loaded from the data on the punched tape. A new table would be required for each reel. Such a system could be made to have the required speed and accuracy needed. It would not make any additions or changes in the audio or video tapes. The need for reloading the possible loss or damage to the punched tape "master," however, would make a rather cumbersome system. Hardware would have to be duplicated at each site (stage). Corrections would be difficult to make.

The final recording is done onto a 35mm sprocketed three-channel magnetic recorder. The mixer, may, in practice, set aside three channels of the audio recorder 18, for recording of the finished sounds. Dialogue is inserted on one channel, sound effects on a second channel and music on a third. Thus, the music track need not be disturbed if the dialogue need be changed, such as for the dubbing of foreign languages.

It must, of course, be recognized that variations in the above description of the preferred embodiment may be possible without departing from the spirit and scope of the present invention. Accordingly, it is intended that the scope of this patent be limited only by the scope of the appended claims.

We claim:
1. A sound editing system comprising
   a. a video recording means having means for starting and stopping said video recorder means;
   b. a first multi-channelled audio tape recorder having means for starting and stopping said first audio tape recorder;
   c. means for synchronizing the movement of said video recorder and said multi-channelled audio tape recorder;
   d. means for visually displaying the position of at least one of said recorders at any time;
   e. a second audio tape recorder, said second audio tape recorder having its audio output connected to a control board, said control board having means for activating a selected channel of said first multi-channelled audio tape recorder, and the output of said control board connected to the input of said first multi-channelled audio recorder;
   f. said control board having a plurality of means for acting upon the input signal to said control board to alter the characteristics of said input signal; and
   g. means for providing a switching signal on at least one channel of said first multi-channelled audio tape recorder for switching the output signal on a second channel of said first multi-channelled audio tape recorder to a selected one of said plurality of means for acting on the input signal to said control board.

2. The sound editing system of claim 1 in which said second audio tape recorder is a multi-channelled audio recorder.

3. The sound editing system of claim 1 in which said second audio recorder has means associated therewith for automatically switching on said second recorder at a predetermined time.

4. The sound editing system of claim 1 in which said first audio tape recorder has an automatic switching means associated therewith for automatically switching on said first recorder at a predetermined time and switching off said first recorder at a second predetermined time.

5. The sound editing system of claim 1 in which said means for synchronizing the movements of said video and audio recording means is controlled by a first position code transmitted by said first audio recorder and a second position code transmitted by said video recorder.

6. The sound editing system of claim 1 in which said switching signals comprise a plurality of switching frequencies.

* * * * *